United States Patent [19]
Kanematsu et al.

[11] Patent Number: 5,458,017
[45] Date of Patent: Oct. 17, 1995

[54] SHIFT LEVER ASSEMBLY FOR POWER TRANSMISSION OF AUTOMOTIVE VEHICLE

[75] Inventors: Hideki Kanematsu; Masaichi Suzuki, both of Kariya, Japan

[73] Assignee: Tsuda Kogyo Kabushiki Kaisha, Aichi, Japan

[21] Appl. No.: 166,029

[22] Filed: Dec. 14, 1993

[30] Foreign Application Priority Data

Dec. 14, 1992 [JP] Japan .................................. 4-332927

[51] Int. Cl.$^6$ ................................................ B60K 20/04
[52] U.S. Cl. ............................................. 74/475; 74/538
[58] Field of Search .............................. 74/475, 538, 537

[56] References Cited

U.S. PATENT DOCUMENTS

| | | | |
|---|---|---|---|
| 2,190,972 | 2/1940 | Boldt | 74/537 |
| 2,598,133 | 1/1950 | Roesch | 74/537 |
| 2,986,362 | 5/1961 | Gimalducki | 74/538 |
| 4,324,149 | 4/1982 | Johansson et al. | 74/475 |
| 5,247,849 | 9/1993 | Sato | 74/538 |
| 5,345,836 | 9/1994 | Yokoyama et al. | 74/473 R |

FOREIGN PATENT DOCUMENTS

| | | | |
|---|---|---|---|
| 2226967 | 12/1973 | Germany | 74/538 |
| 3168464 | 7/1991 | Japan | 74/538 |
| 415356 | 1/1992 | Japan | 74/475 |

Primary Examiner—Rodney H. Bonck
Assistant Examiner—David Fenstermacher
Attorney, Agent, or Firm—Fisher & Associates

[57] ABSTRACT

A shift lever assembly composed of a tubular lever member mounted at its lower end on a stationary support block to be shifted in a fore-and-aft direction, an operation rod slidably disposed within an axial bore of the lever member and provided at its lower end with a detent mechanism for retaining the lever member in a shifted position, and an operation knob having a grip portion connected to the upper end of the lever member and an operation button assembled with the grip portion, wherein the grip portion is formed with a cavity which opens in one direction and contains the upper end of the operation rod, and the operation button is rotatably assembled within the cavity of the grip portion to be moved downward along a semi-circular path by operation of the operator, the operation button having a projection formed therewith for engagement with the upper end of the operation rod and being biased upward by a spring assembled within the cavity of the grip portion.

2 Claims, 7 Drawing Sheets

SHIFT LEVER ASSEMBLY FOR POWER TRANSMISSION OF AUTOMOTIVE VEHICLE

BACKGROUND OF THE INVENTION

1. Field of the Invention

The present invention relates to a shift lever assembly adapted for use in a power transmission of an automotive vehicle.

2. Description of the Prior Art

As disclosed in Japanese Utility Model Publication Nos. 62-162719 and 63-49764, a conventional shift lever assembly for a power transmission is composed of a tubular lever member rotatably mounted at its lower end on a support block secured to a vehicle body structure to be moved in a fore-and aft direction and connected to a shift arm of the power transmission by means of a connecting linkage, an operation knob connected to the upper end of the tubular lever member, a detent mechanism provided within an internal bore of the lever member to releasably restrict movement of the lever member with respect to the support block. When the detent mechanism is released by operation of the operation knob, the level member can be moved forwardly or backwardly to shift the power transmission.

The operation knob has a grip portion connected to the upper end of the lever member, the grip portion being formed therein with a lateral cavity opening outwardly at one side thereof and containing the upper end of an operation rod of the detent mechanism therein, an operation button slidably disposed within the lateral cavity of the grip portion, the operation button being exposed outwardly at its one end and engaged with the upper end of the operation rod at its other end, and a spring assembled within the lateral cavity to bias the operation button outwardly. In operation of the operation knob, the operation button is pushed inwardly against the biasing force of the spring to move the operation rod downward. Thus, the detent mechanism is released by downward movement of the operation rod to permit forward or backward movement of the lever member.

In the operation knob, the engagement portion of the operation button with the upper end of the operation rod is formed with an inclined cam surface on which the operation effort applied to the button in the lateral direction is converted into a downward force for movement of the operation rod. Accordingly, lateral movement of the operation button causes sliding movement of the inclined cam surface relative to the upper end of the operation rod. This results in an increase of the load acting on the operation button. Although the operation button is slidably assembled within the grip portion, it is difficult to provide the operation button with sufficient sliding surfaces in the grip portion. This results in unwanted movements of the operation button in operation.

SUMMARY OF THE INVENTION

It is, therefore, a primary object of the present invention to provide an improved shift lever assembly capable of minimizing the load acting on the operation button without causing unwanted movements of the operation button in operation.

According to the present invention, the object is attained by providing a shift lever assembly adapted for use in a power transmission of an automotive vehicle, which comprises a tubular lever member formed therein with an axial bore and mounted at its lower end on a stationary support block secured to a vehicle body structure to be shifted in a fore-and-aft direction; an operation rod slidably disposed within the axial bore of the tubular lever member and provided at its lower end with a detent mechanism for retaining the lever member in a shifted position, and an operation knob having a grip portion connected to the upper end of the tubular lever member and an operation button assembled with the grip portion and maintained in engagement with the upper end of the operation rod to release the detent mechanism when operated by an operator; wherein the grip portion of the operation knob is formed with a cavity which opens in one direction and contains the upper end of the operation rod, the operation button of the operation knob is rotatably assembled within the cavity of the grip portion to be moved downward along a semi-circular path by operation of the operator, the operation button being formed with a projection for engagement with the upper end of the operation rod, and resilient means is assembled within the cavity of the grip portion to bias the operation button upward for engagement with an upper end of the cavity.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
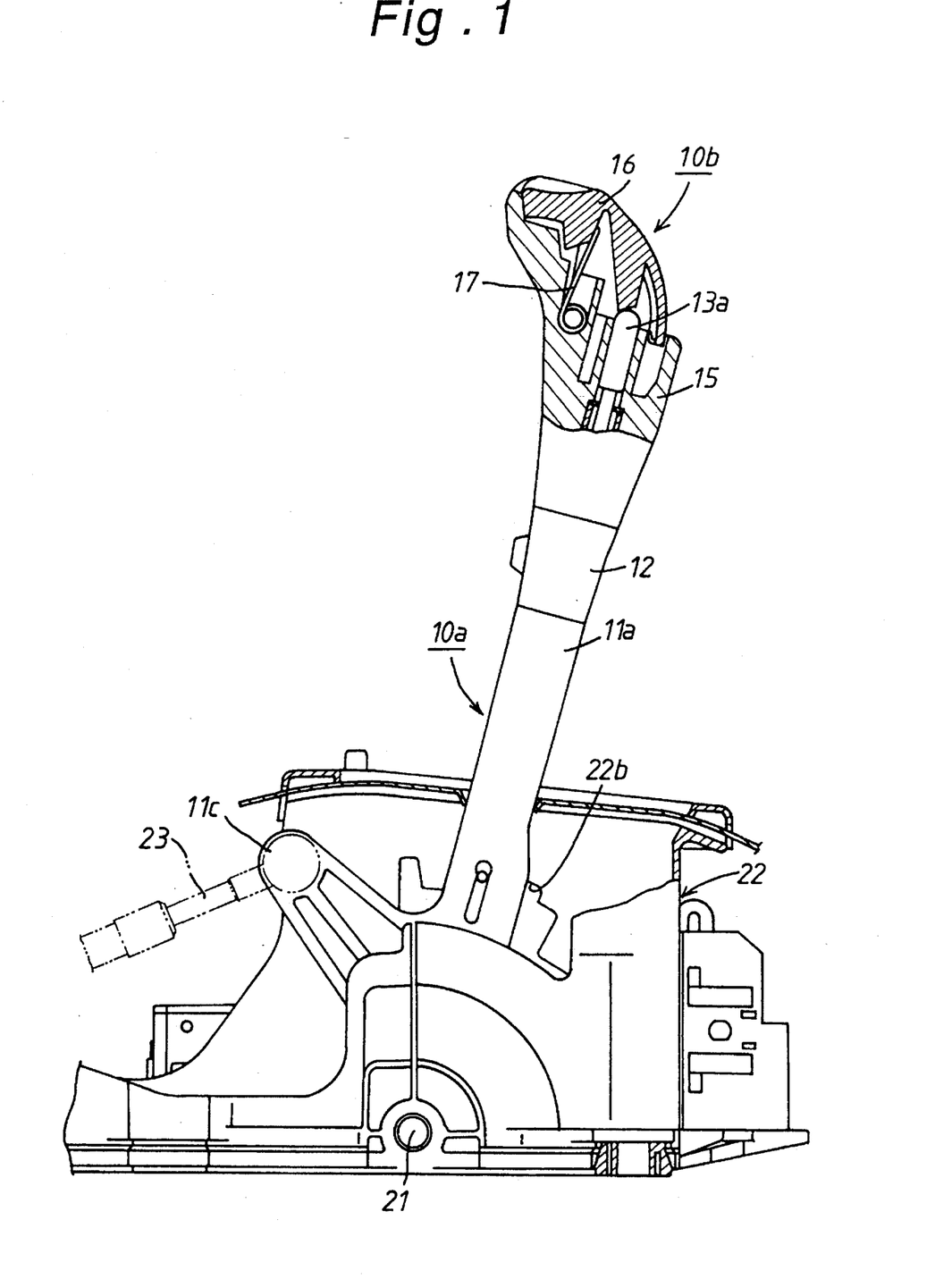
FIG. 1 is a partly broken side view of a change-speed operation mechanism equipped with a shift lever assembly according to the present invention.
Figure 2:
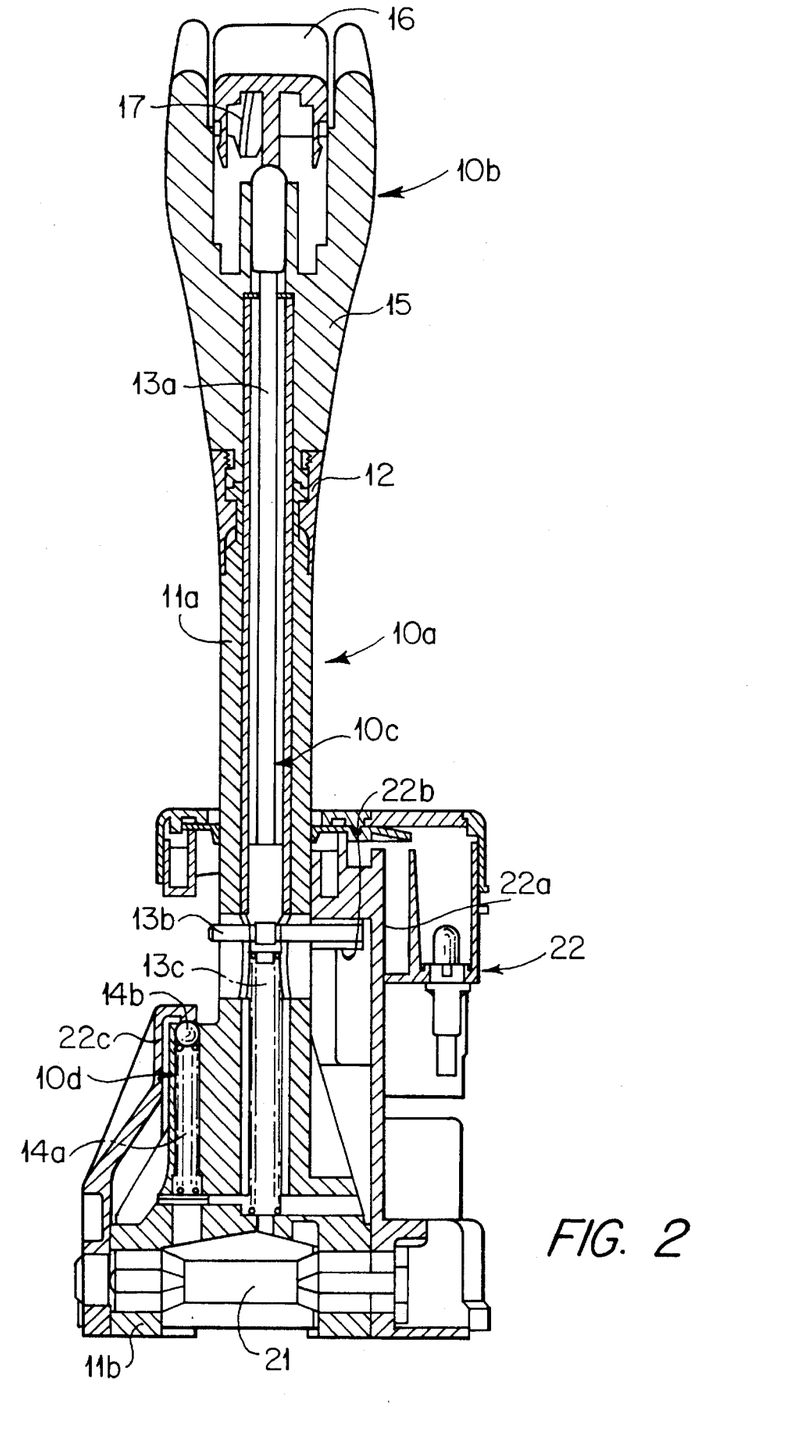
FIG. 2 is a vertical sectional view of the shift lever assembly.

Referring now to the drawings, FIG. 1 illustrates a change-speed operation mechanism which is mounted on a support block 22 secured to a vehicle body structure (not shown) and operatively connected to an automatic power transmission (not shown). As shown in FIGS. 1 and 2, the change-speed operation mechanism includes a shift lever assembly composed of a lever member 10a, an operation knob 10b, a first detent mechanism 10c and a second detent mechanism 10d. The lever member 10a is in the form of a tubular lever member 11a integrally formed at its lower end with a support portion 11b perpendicularly thereto and a connecting arm 11c extending forwardly from its lower end portion. The operation knob 10b is assembled with the upper end of tubular lever member 11a by means of a joint means 12. The first detent mechanism 10c is disposed within an axial bore of the tubular lever member 11a, and the second detent mechanism 10d is assembled with the lower end of the tubular lever member 11a at one side thereof. As shown in FIG. 2, a lateral support shaft 21 is coupled within an axial bore of the support portion 11b and carried by mutually opposed upstanding portions of the support block 22 so that the tubular lever member 11a is arranged to be shifted forwardly or backwardly. In a condition where the tubular lever member 11a has been assembled with the support block 22 as described above, the connecting arm 11c of lever member 11a is connected at its distal end to one end of an inner wire 23 of an operation cable as shown in FIG. 1, and the other end of inner wire 23 is connected to a shift arm (not shown) of the automatic power transmission.

As clearly shown in FIG. 2, the first detent mechanism 10c includes an operation rod 13a, a lateral engagement pin 13b and a compression coil spring 13c, The operation rod 13a is slidably disposed within the axial bore of tubular lever member 11a. The engagement pin 13b is fixed to the lower end of operation rod 13a perpendicularly thereto and extends outwardly at its opposite ends through a pair of elongated holes formed in the peripheral wall of tubular lever member 11a. The compression coil spring 13c is disposed within the axial bore of tubular lever member 11a to bias the operation rod 13a upwardly. In such an arrangement of the first detent mechanism 10c, the engagement pin 13b is loaded upward by the compression coil spring 13c and engaged at its right-hand end with one of plural recesses 22b formed on the right-hand upstanding portion 22a of support block 22 to restrict the forward or backward movement of the tubular lever member 11a.

As clearly shown in FIG. 2, the second detent mechanism 10d includes a compression coil spring 14a disposed within an additional axial bore formed in an enlarged lower end of tubular lever member 11a and a detent ball 14b carried by the compression coil spring 14a. The detent ball 14b is maintained in engagement with one of plural recesses formed on the left-hand upstanding portion 22c of support block 22. In the second detent mechanism 10d, the detent ball 14b passes over the recess engaged therewith in forward or backward movement of the shift lever assembly and is successively engaged with other recesses of the left-hand upstanding portion 22c under the load of compression coil spring 14a. This is effective to apply an operatinal feel to the operator in shifting operation of the shift lever assembly and to retain the shift lever assembly in its shifted position.

Figure 3:
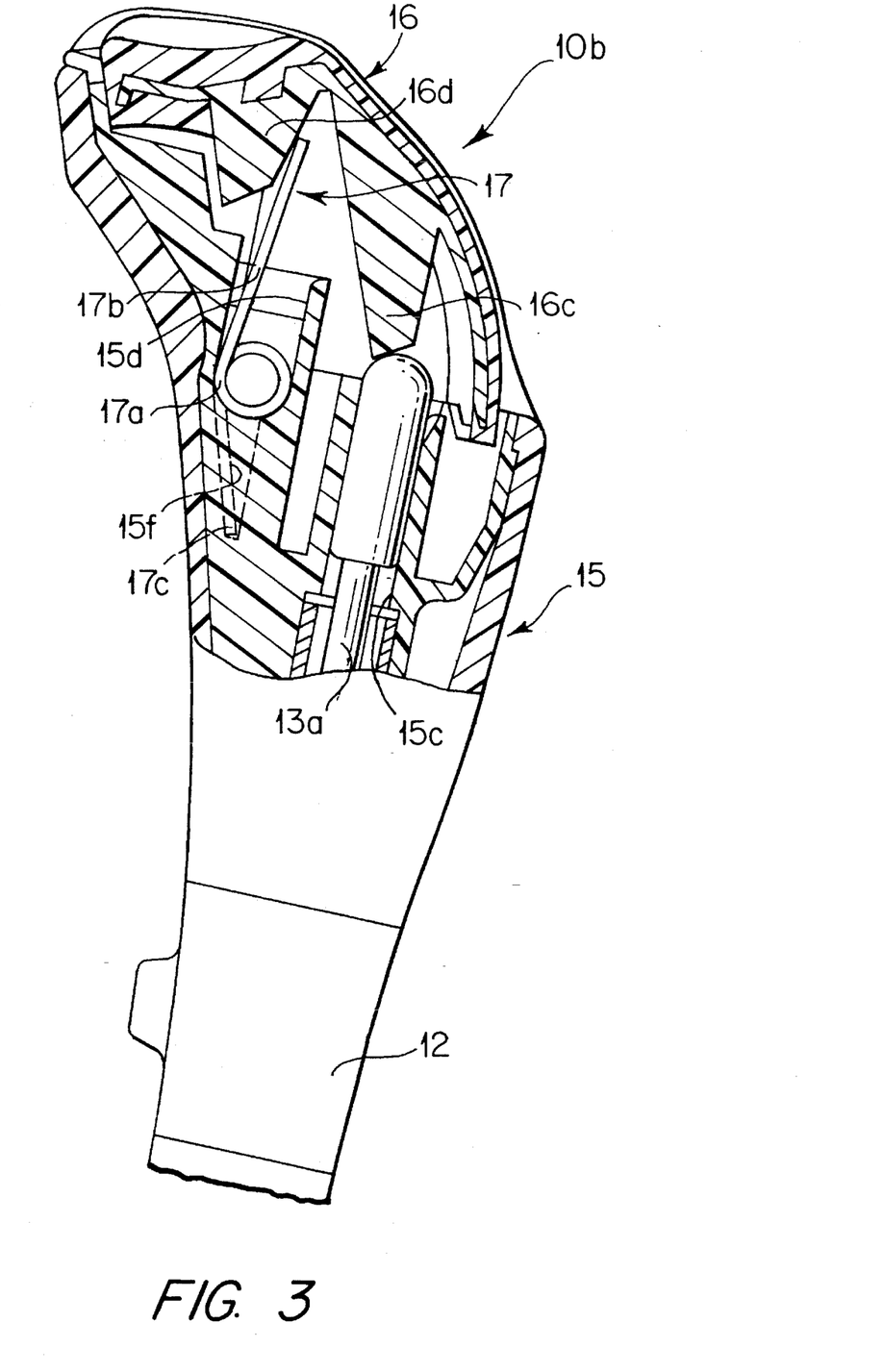
FIG. 3 is an enlarged sectional view of an operation knob of the shift lever assembly.
Figure 4:
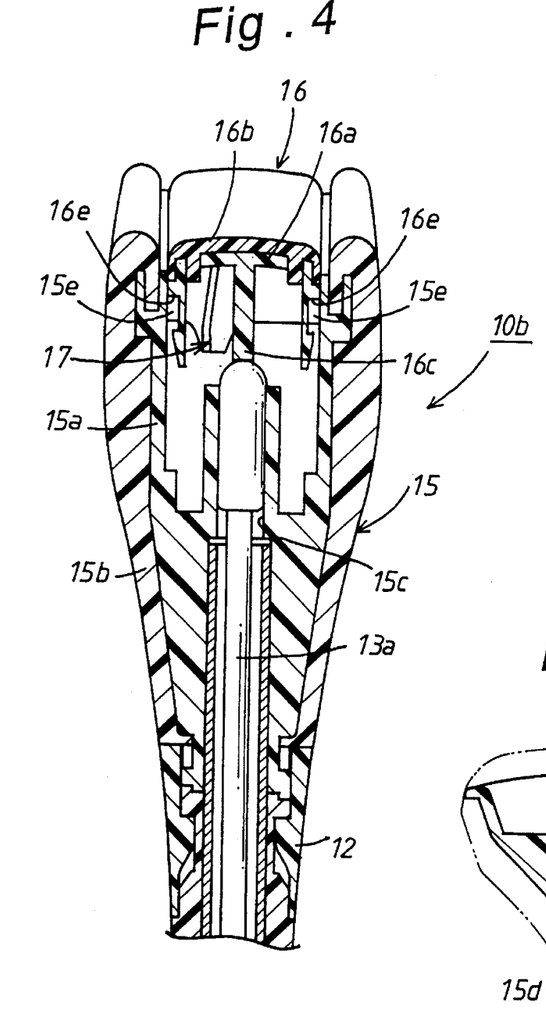
FIG. 4 is an enlarged sectional rear view of the operation knob.
Figure 5:
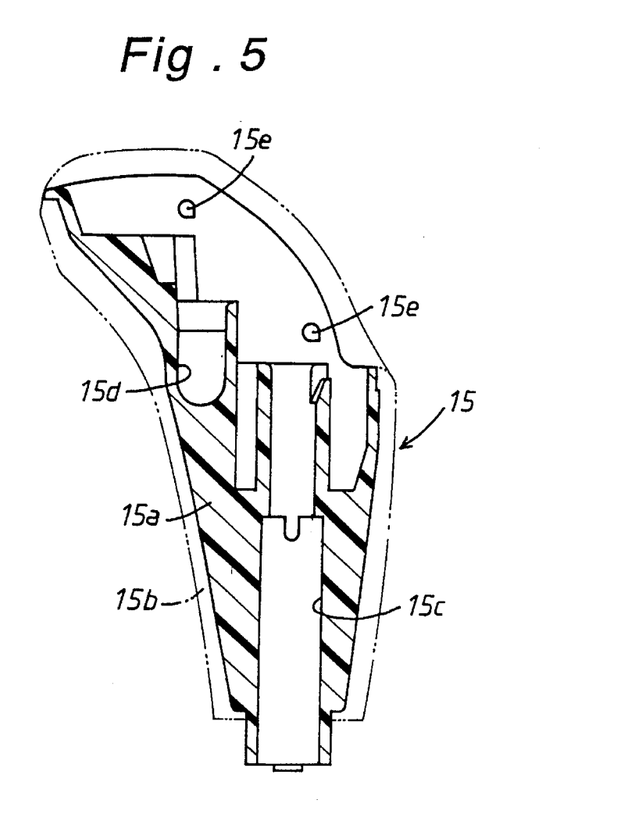
FIG. 5 is an enlarged sectional side view of a grip portion of the operation knob.

As shown in FIGS. 3 and 4, the operation knob 10b has a grip portion 15, an operation button 16 rotatably assembled within the grip portion 15 and exposed outwardly at its upper part and a torsion spring 17 assembled within the grip portion 15. The grip portion 15 and operation button 16 are respectively composed of an internal layer portion 15a, 16a of hard synthetic resin and an external layer portion 15b, 16b of soft synthetic resin. The grip portion 15 is formed with a cavity opening upwardly. The internal layer portion 15a of hard synthetic resin is formed with an axial bore 15c extending downwardly and a recess 15d located in parallel with the axial bore 15c. As shown in FIGS. 4 and 5, the internal layer portion 15a of grip portion 15 is formed at its opposite side walls with a pair of spaced support pins 15e which are arranged along a semi-circular path and project inwardly at the upper portion of the cavity in grip portion 15. In a condition where the grip portion 15 has been connected to the upper end of tubular lever member 11a, the operation rod 13a of detent mechanism 10c extends into the cavity of grip portion 15 through the axial bore 15c of internal layer portion 15a.

Figure 6:
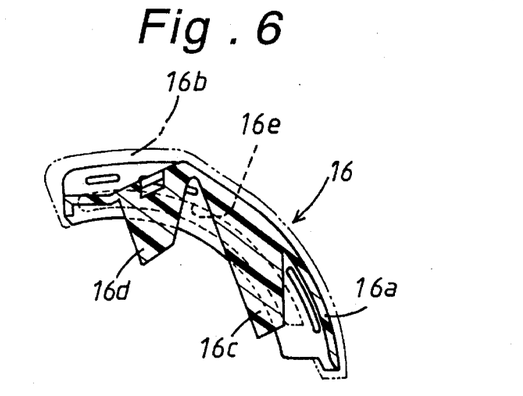
FIG. 6 is an enlarged sectional side view of an operation button of the operation knob.

The internal layer portion 16a of operation button 16 is formed with first and second projections 16c, 16d which extend downwardly in the cavity of grip portion 15, and the external layer portion 16b of operation button 16 is formed to cover the cavity of grip portion 15. As shown in FIG. 6, the internal layer portion 16a of operation button 16 is formed at its opposite sides with a pair of semi-circular grooves 16e for engagement with the spaced support pins 15e of grip portion 15. The operation button 16 is coupled with the upper opening trim of grip portion 15 so that the semi-circular grooves 16e of button 16 are engaged with the support pins 15e of grip portion 15. In such a condition, the operation button 16 is slidably supported by the support pins 15e of grip portion 15 to be movable along the semi-circular grooves 16e and is engaged at its upper end with the upper edge of grip portions 15. Thus, upward movement of the button 16 is restricted by engagement with the upper edge of grip portion 15, and downward movement of the button 16 is restricted by engagement with the upper support pins 15e.

As shown in FIG. 3, a torsion spring 17 is formed with a coiled portion 17a and a pair of legs 17b, 17c. The coiled portion 17a of spring 17 is contained within the internal recessed portion 15d of grip portion 15 in such a manner that the spring 17 is engaged at its one leg 17b with a side face of the second projection 16d of button 16 and at its other leg 17c with a groove 15f formed in the peripheral wall of grip portion 15. Thus, the operation button 16 is retained in an upward position by the biasing force of spring 17 to cover the cavity of grip portion 15 and is engaged at its first projection 16c with the upper end of operation rod 13a.

When the grip portion 15 has been grasped by an operator's hand for use of the operation knob 10b, the operation button 16 can be operated by the thumb of his hand against the biasing force of the spring 17 to push down the head of operation rod 13a at its first projection 16c. Thus, the first detent mechanism 10c is released by downward movement of the operation rod 13a to permit forward or backward movement of the shift lever assembly for shifting the power transmission. In such operation of the operation knob 10b, the operation button 16 is rotated along the semi-circular path to cause the downward movement of operation rod 13a. Thus, the operation effort applied to the button 16 is directly transmitted to the operation rod 13a. This is useful to decrease the load acting on the operation button 16. Since the operation button 16 is assembled with the grip portion 15 by means of engagement with the support pins 15e of grip portion 15 at its semi-circular grooves 16e, the sliding portion of operation button 16 can be prolonged to minimize unwanted movements of the operation button 16 so as to enhance operational feel of the operation button 16.

Figure 7:
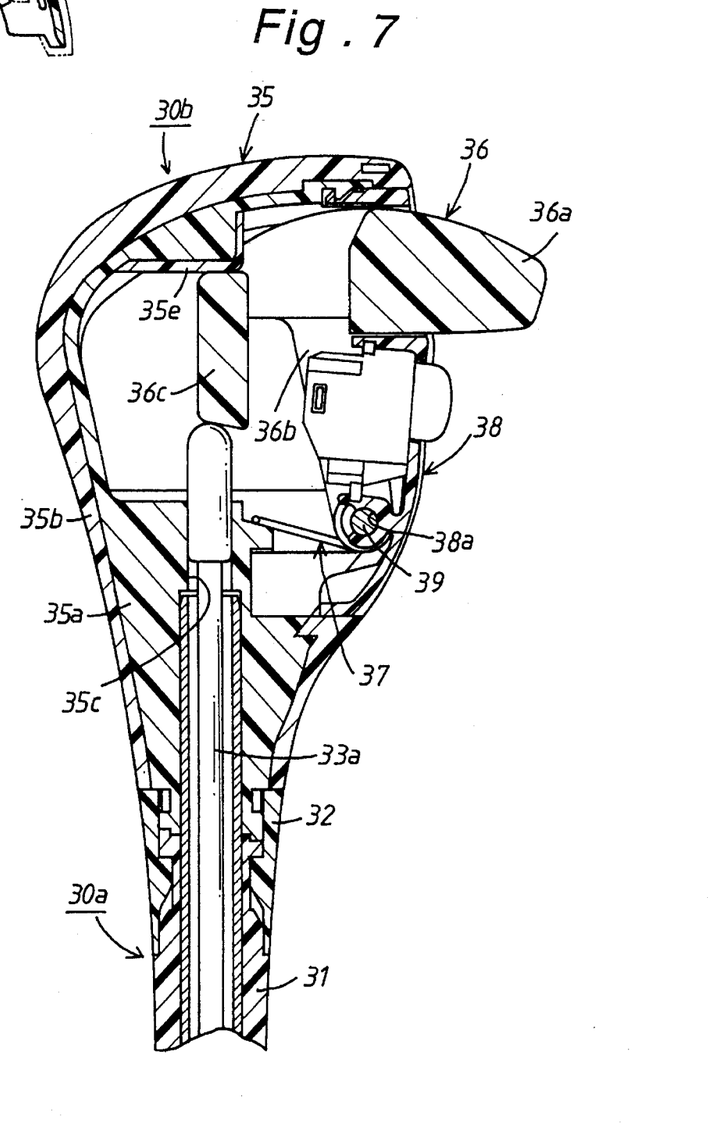
FIG. 7 is a sectional side view of an operation knob of another embodiment of a shift lever assembly according to the present invention.
Figure 8:
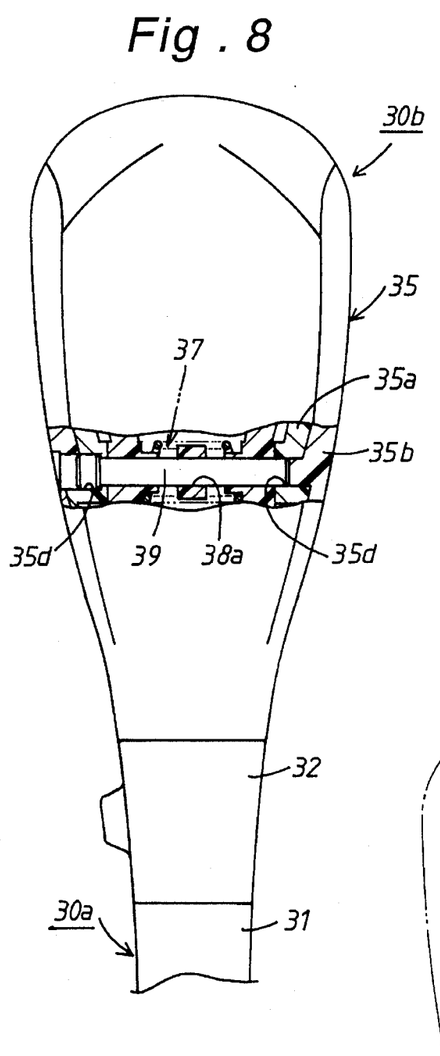
FIG. 8 is a partly broken rear view of the operation knob shown in FIG. 7.
Figure 9:
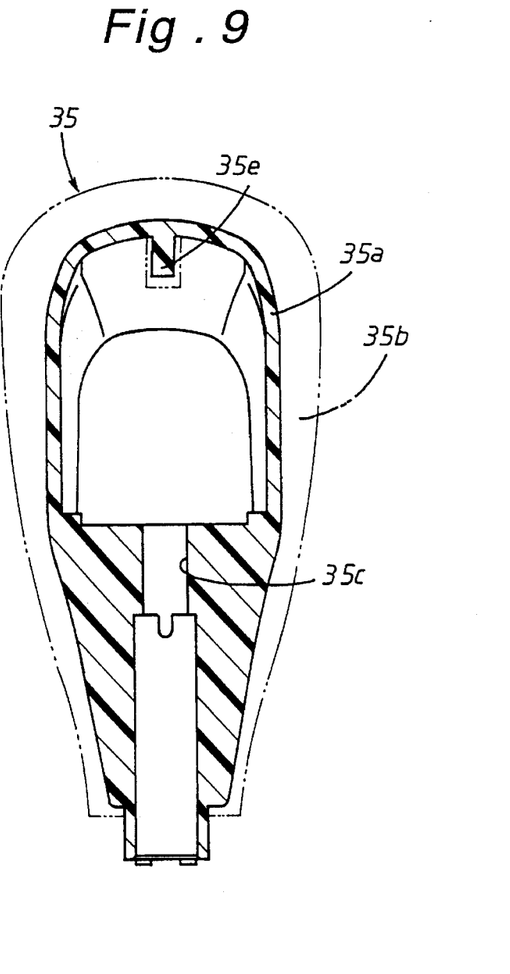
FIG. 9 is a sectional front view of a grip portion of the operation knob shown in FIG. 7.

In FIGS. 7 and 8, there is illustrated another embodiment of the present invention, wherein an operation knob 30b is composed of a grip portion 35, an operation button 36, a torsion spring 37 and a cover member 38. The grip portion 35 is composed of an internal layer portion 35a of hard synthetic resin and an external layer portion 35b of soft synthetic resin. The operation button 36 and cover member 38 each are made of hard synthetic resin. As shown in FIGS. 7–9, the grip portion 35 is formed therein with a cavity opening in a lateral direction. The internal layer portion 35a of grip portion 35 is formed with an axial bore 35c extending in a vertical direction and a pair of laterally spaced support holes 35d which are located at a bottom portion of the cavity in grip portion 35 as shown in FIG. 8. The internal layer portion 35a of grip portion 35 is further formed with a projection 35e which is composed of hard and soft synthetic resin layers and is opposed to the axial bore 35c. In a condition where the grip portion 35 has been connected to the upper end of a lever member 30a and a tubular lever member 31 by means of a joint means 32, an operation rod 33a of a detent mechanism (not shown) is extended into the cavity of grip portion 35 through the axial bore 35c of internal layer portion 35a.

Figure 10:
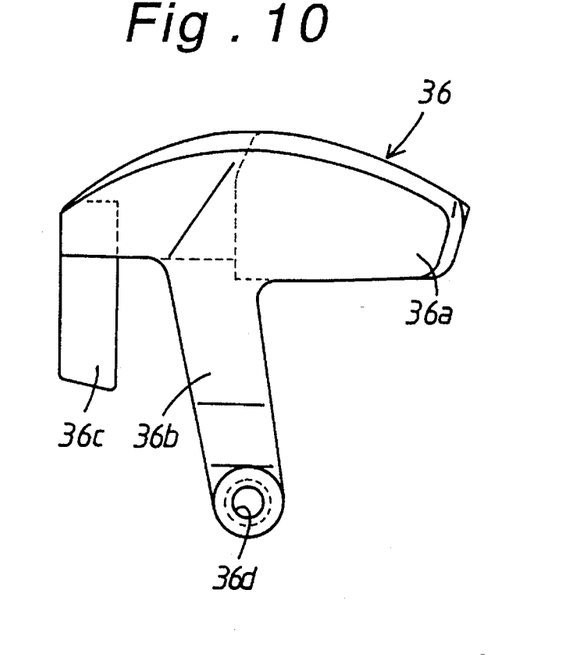
FIG. 10 is a side view of an operation button of the operation knob.
Figure 11:
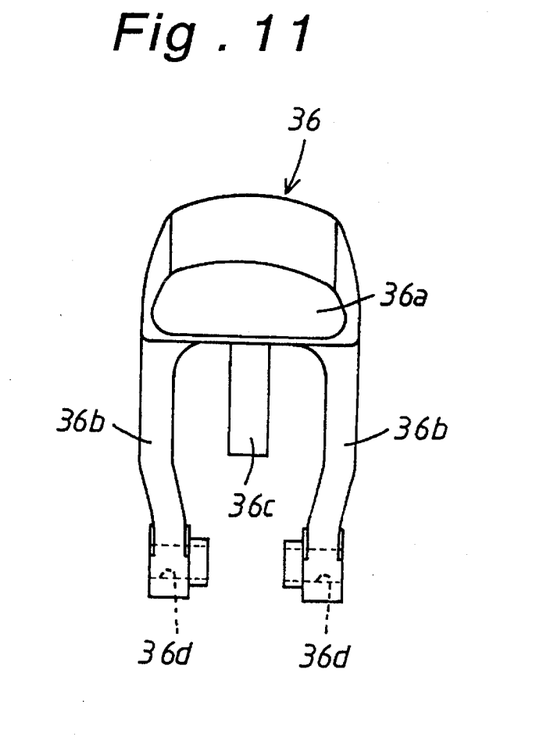
FIG. 11 is a front view of the operation button shown in FIG. 10.

As shown in FIGS. 10 and 11, the operation button 36 is formed with a body portion 36a, a pair of legs 36b and a projection 36c and is further formed with support holes 36d at the lower ends of its legs 36b. As shown in FIG. 7, the operation button 36 is assembled within the cavity of grip portion 35 in such a manner that the body portion 36a is exposed outwardly through a portion of the cover member 38 which is coupled with the opening of the cavity of grip portion 35. The operation button 36 is rotatably carried by a support pin 39 which is inserted into the support holes 36d of legs 36b and engaged at its opposite ends with the support holes 35d of grip portion 35. The cover member 38 is formed at its internal wall with a projection 38a which is coupled with the support pin 39 of operation button 36 to retain the cover member 38 in place.

The torsion spring 37 is formed with a coiled portion and a pair of legs in the same manner of the torsion spring 17 shown in FIG. 3. The coiled portion of spring 37 is arranged in surrounding relationship with the support pin 39 of operation button 36 so that the spring 37 is engaged at its one leg with a bottom of the cavity of grip portion 35 and at its other leg with one of the legs 36b of operation button 36. In such an arrangement of the torsion spring 37, the projection 36c of operation button 36 is resiliently engaged at its upper end with the internal projection 35e of grip portion 35 under the biasing force of spring 37 and is engaged at its lower end with the upper end of operation rod 33a.

When the grip portion 35 has been grasped by an operator's hand, the body portion 36a of operation button 36 can be rotated inwardly by the thumb of his hand against the biasing force of spring 37 to push down the operation rod 33a at its projection 36c. Thus, the detent mechanism is released by downward movement of the operation rod 33a to permit forward or backward movement of the shift lever assembly for shifting the power transmission. In such operation of the operation knob 30b, the operation button 36 is rotated along a semi-circular path to cause the downward movement of operation rod 33a. Thus, the operation effort applied to the button 36 is directly transmitted to the operation rod 33a. This is useful to minimize the load acting on the operation button 36 so as to enhance operational feel of the operation button 36.

What is claimed is:

1. A shift lever assembly adapted for use in a power transmission of an automotive vehicle, comprising a tubular lever member formed therein with an axial bore and mounted at a proximal end of said tubular lever member on a stationary support block secured to a vehicle body structure to be shifted in a fore-and-aft direction; an operation rod slidably disposed within said axial bore of said tubular lever member and provided at a proximal end of said operation rod with a detent mechanism for retaining said lever member in a shifted position, and an operation knob having a grip portion connected to a distal end of said tubular lever member and an operation button assembled with said grip portion and maintained in engagement with a distal end of said operation rod to release said detent mechanism when operated by an operator;

wherein said grip portion of said operation knob is formed with a cavity which opens in one direction and contains said distal end of said operation rod, said operation button of said operation knob is rotatably assembled within said cavity of said grip portion to be moved downward with respect to said cavity and along a semi-circular path by operation of said operator, said operation button being formed with a projection for engagement with said distal end of said operation rod, and resilient means is assembled within said cavity of said grip portion to bias said operation button toward an upward position so that said cavity of said grip portion is covered by said operation button.

2. A shift lever assembly as claimed in claim 1, wherein said cavity of said grip portion is opened upward and covered by said operation button, said grip portion has a pair of opposed internal side walls respectively formed with a pair of spaced support pins which are arranged along a semi-circular path and projected into said cavity at a position on said internal side walls located between said distal end of said operation rod and said cavity opening, and said operation button has a pair of side portions respectively formed with a semi-circular groove slidably engaged with the support pins of said grip portion.

* * * * *